2,874,053
CULINARY MIXES AND METHODS OF
PREPARING THE SAME

Victor Mills, Wyoming, Ohio, assignor to The Procter & Gamble Company, Cincinnati, Ohio, a corporation of Ohio No Drawing. Application April 11, 1958
Serial No. 727,784

8 Claims. (Cl. 99—94)

This invention relates to culinary mixes and to methods for preparing such mixes. In particular, it relates to pulverulent mixes comprising sugar, flour, and shortening, and which are suitable for use in preparing baked goods.

The use of so called "prepared mixes" for baked goods has achieved wide usage, particularly in home baking. In mixes of this type, dry ingredients are combined in proper proportions and packaged. Liquid materials such as water, milk, and/or eggs, are added to the mix to prepare it for use in baking. Thus, by use of prepared mixes, one of the problems in baking, variation in ingredients, has been eliminated to a large degree.

In prior art prepared mixes, the procedure for use has been complicated. This is particularly true for mixes which are used to prepare batters to be baked into cakes. For light, large-volume cakes it is desirable that a large amount of air be incorporated into batter, and that this air be uniformly distributed throughout the batter. To achieve this result, it has frequently been necessary to add to the mix only a portion of the required liquid ingredients, and then to beat or otherwise agitate for several minutes. Additional ingredients are then added, followed by further agitation. In such a process the variation in following instructions, which normally would be expected, results in undesirable properties in the baked goods produced. For example, in the preparation of a cake, coarse granular structure, small volume, and either dryness or sogginess can result from a departure from optimum mixing conditions. The undesirable properties result particularly when the time or degree of agitation is reduced.

It has now been found that by the process of this invention, a culinary mix can be prepared which requires only a simplified treatment preparatory to baking. In particular, the time or degree of agitation to achieve the proper degree of mixing and aeration of the batter is considerably reduced when preparing batters from the products of this invention. Thus, not only has the problem of ingredient variation been eliminated, but also a critical part of the processing technique rendered less critical.

A problem which has been encountered in making prior art mixes containing plastic shortening is that a large amount of work and time is necessary to insure a thorough mixing of the shortening with the other dry ingredients of the mixes. While it has been suggested that this problem can be aided by adding the shortening in liquid form, such a procedure tends to result in cakes which are coarser in texture and smaller in size than are cakes prepared from mixes in which the shortening is added in plastic form. It has now been found that the addition of shortening in liquid form to mixes prepared by the process of the invention will simplify the preparation of the mix and will result in improved cakes baked from mixes.

The culinary mixes of this invention are light and fluffy having a low and uniform density. As a result, a large amount of air is carried into batter made from the mix. The mix is uniform in composition, non-greasy, and free flowing when compared with prior art mix compositions which tend to be agglomerated, lumpy, and greasy. Cakes baked from mixes of this invention are large in volume, have a fine grained texture and are moist.

Accordingly it is one of the objectives of this invention to provide a culinary mix which permits a simplified final preparation for baking.

A further object is to provide a culinary mix to which all liquid ingredients may be added at one time.

Another object is to provide a culinary mix having superior appearance and physical properties.

A still further object is to provide a culinary mix having particles of uniform density.

Other objects and advantageous features will be apparent from the following detailed description and examples.

In general, this invention comprises forming a homogenous blend containing crystalline sugar, flour, and shortening, and thereafter subjecting said blend to simultaneous shearing and crushing forces, whereby a pulverulent and free-flowing mix is obtained. Mixes of this invention have a major part of the sugar crystals fragmented and mechanically bonded to particles of the flour. The shortening is substantially dispersed in a thin film throughout and coating the bonded sugar and flour.

The initial step in practicing the process of this invention is to thoroughly premix the sugar, flour, and shortening to form a homogenous blend. Other ingredients of the mix can be combined at this time, except that inferior cakes may result if baking soda and cocoa (if used) are added prior to the shearing and crushing step. Materials which can be added either before or after the application of the shearing and crushing forces include baking acids, egg solids, salt, milk solids, flavoring, and coloring. Except as stated heretofore, the order in which the ingredients are added is not a highly critical factor in the performance of the mix, and the amounts of the ingredients may vary widely as will hereinafter be set forth. It is also possible to add a small part of the sugar, flour and shortening after the shearing and crushing step. In particular, the later addition of a part of the shortening may facilitate the processing. However, it is preferable that a major part of the sugar, flour, and shortening be subjected to the shearing and crushing forces.

A wide variety of mixing means can be used for the premixing step including planetary bowl mixers, ribbon mixers, other conventional dough mixers, and fluidized beds, so long as the mixing means provides for adequate dispersion of fat and the formation of a homogenous blend.

After the premixing step it may be desirable, preparatory to applying the shearing and crushing forces characteristic of the present invention, to further break up and mix particles present in the premixed blend by an impact grinding device such as is disclosed in U. S. Patent No. 2,339,737, issued January 18, 1944. This device comprises two parallel horizontal discs spaced apart by interconnecting pins extending at right angles to the surfaces of the discs. An external shell encloses the discs. Material to be treated is passed through a hole in the center of the top disc while the discs are revolving at a high rate of speed. Centrifugal force impacts the material against the pins and the external shell, thereby breaking up any large particles or agglomerates present. The broken up material passes out through an outlet at the bottom of the device. Other devices suitable for this purpose and well-known in the art may also be used.

The premixed blend is then subjected to means which will simultaneously apply a shearing and crushing force to the mixture. The purpose of such means is to fragment the sugar crystals and to bond a significant portion of the fragmented crystals to the flour. Such treatment also tends to imbed the sugar fragments in the flour. Also, during this step the shortening is distributed throughout the mix, forming a thin film throughout the sugar and flour, and coating the bonded sugar and flour. Some particles of free crushed sugar may also be imbedded in the fat film, providing discontinuity in the film.

An effective apparatus for producing the shearing and crushing forces is a roller mill in which adjacent rollers revolve at different speeds. Very satisfactory results can be obtained when the ratio of roll speeds of adjacent rolls range from about 2:1 to about 5:1, although larger ratios may also be used. The mix can be treated by a single pass between the rollers or by several passes. However, a large number of passes between the rollers may prove to be economically unsound.

Prolonged heating of the mix at temperatures which will cause some deterioration of the components of the mix may have an adverse effect on baked goods prepared from the mixes. However, it may be desirable to increase operating efficiency by applying heat to the rollers. Therefore, it may be desirable to either heat or cool the rollers during the milling process to produce an optimum product.

A convenient measure of the milling conditions is by work input to the mix. Although the optimum value will be set by the efficiency of the equipment and by the components of the mix, a total work input of 5 to 70 watt hours per pound will provide a satisfactory cake mix. Preferably the work input should be from 10 to 40 watt hours per pound. If the sugar is initially added to the mix in the form of extremely fine particles, less work input may be required than if the sugar is in the form of larger granules.

At the conclusion of the shearing and crushing step, any remaining ingredients are added, using mixing apparatus of the type described for the premixing step. This final mixing should be continued until all of the ingredients are adequately dispersed and the product has a uniform composition.

When a roller mill is used a part of the product may be in the form of flakes, and it may be desirable, as a final step, to subject the mix to some means which will completely break up these flakes. The impacting device previously described will accomplish this in a very satisfactory manner.

The bonding of the sugar and flour, and the resulting uniform density of the bonded sugar and flour, can be clearly shown by a sedimentation test. Fat present in the mix is extracted from the mix by hexane at 120° F. Equal amounts of the fat-extracted mix are added to benzene-carbon tetrachloride liquid mixtures having various densities. By measuring the amounts of fat-free mix which float and sink in the liquid mixtures of various densities, it has been found that not more than 10% of a fat-free mix of this invention will have a density greater than 1.59 and not more than 25% will have a density less than 1.50. For convenience, the density measured in this manner will hereinafter be referred to as "sedimentation density." When sugar and flour mixtures in which the sugar and flour are not bonded are tested in this manner, it is found that the sugar and flour separate and all of the sugar will have a density greater than 1.59 while substantially all of the flour will have a density less than 1.47.

A wide variety of culinary mixes can be produced by this invention including white, chocolate, yellow and spice cakes, as well as other goods such as cookies. Preferred ranges of ingredients are as follows:

| | Percent |
|---|---|
| Sugar | 38 to 48 |
| Flour | 28 to 45 |
| Shortening | 4 to 25 |
| Leavening agents | 1 to 4 |
| Cocoa | 0 to 7 |
| Egg solids | 0 to 5 |
| Non-fat dry milk solids | 0 to 5 |
| Flavoring (including spices) | 0 to 2 |
| Coloring | Minor amounts |

In general, the types and qualities of the above materials are those which can be used in mixes of the prior art. For example, the shortening can include animal or vegetable fats, saturated or unsaturated, and can vary in plasticity from very firm to liquid. Emulsifiers of the commonly used types can also be present in the shortening in suitable amounts and proportions.

The practice of this invention will provide an especially good cake mix when the ratio of sugar to flour is greater than 1:1. Shortening used in such mixes should contain suitable emulsifiers such as partially esterified polyhydric compounds having surface active properties. These include, but are not limited to, mono- and diglycerides of fatty acids, such as monostearin, monopalmitin, mono-olein and dipalmitin; higher fatty acid esters of sugars, such as sucrose partial palmitate and sucrose partial oleate; and phosphoric and sulfuric acid esters, such as dodecyl glyceryl ether sulfates and monostearin phosphate. These partial esters may also include derivatives of carboxylic acids such as lactic, citric, and tartaric acids. An example of such a derivative is glyceryl lacto-palmitate. Other suitable emulsifying agents include polyoxyethylene ethers of fatty esters of polyhydric alcohols, such as the polyoxyethylene ethers of sorbitan monostearate or the polyoxyethylene ethers of sorbitan distearate.

Flour customarily used in prepared mixes is bleached cake flour, containing at least 50% wheat flour. Up to 50% of the flour can be replaced by starch. If suitable emulsifiers are used, a general purpose flour will give very good results.

Suitable sugars for use in this invention include any of the commonly used granular sugars including sucrose, dextrose, maltose, fructose, levulose, lactose, and brown and invert sugars. Mixtures of one or more sugars can also be used. Prior to the initial blending step the sugar may be reduced to powder form.

One of the most commonly used tests for evaluating cakes is by a measurement of volume in cubic centimeters per pound. The superiority of cakes baked from mixes subjected to a simultaneous shearing and crushing step over these not so treated is shown in Example I which lists the components treatment and resulting cake volume of representative yellow and chocolate cake mixes prepared with and without the step of passing through a roller mill. A three roll mill was used, having speed ratios of 3 to 1 between the first two rolls, and 2 to 1 between the second and third rolls. Two passes through the mill were made of each milled mix.

In each case the batter was prepared by adding the water and eggs to 20 oz. of mix. It was then beaten as indicated by hand or by a household electric mixer at medium speed for two minutes. The batter was then poured into an 8-inch circular pan and baked at a temperature of 350° to 375° F. for about 30 minutes, and the resulting cake volumes were measured.

EXAMPLE I

|  | Yellow | | Chocolate | |
| --- | --- | --- | --- | --- |
|  | Unmilled | Milled | Unmilled | Milled |
| Pre-mix ingredients (lbs.): | | | | |
| Sugar | 42.8 | 42.8 | 43.4 | 43.4 |
| Shortening | 13.0 | 13.0 | 13.0 | 13.0 |
| Flour | 40.0 | 40.0 | 32.4 | 32.4 |
| Milk solids | 1.75 | 1.75 | 2.5 | 2.5 |
| Salt | .75 | .75 | .7 | .7 |
| Processing: | | | | |
| Pre-mix time (min.) | 4.5 | 4.5 | 2.5 | 2.5 |
| Pre-mix temperature (° F.) | 75 | 75 | 80 | 80 |
| Mill mixing, watt hrs./lbs. | 0 | 20 | 0 | 13 |
| Mix temp. after milling (° F.) |  | 82 |  | 82 |
| Additional ingredients (lbs.): | | | | |
| Cocoa |  |  | 6.2 | 6.2 |
| Baking acids | 1.06 | 1.06 | 0.5 | 0.5 |
| Baking soda | 0.64 | 0.64 | 1.3 | 1.3 |
| Final dry mix processing: | | | | |
| Finish mix time (min.) | 3 | 3 | 5 | 5 |
| Finish mix temperature (° F.) | 80 | 80 | 80 | 80 |
| Mix density (gm./cc.) | 0.53 | 0.43 |  | 0.44 |
| Liquid ingredients added in making batter: | | | | |
| Water (cups) | 1 | 1 | 1 1/16 | 1 1/16 |
| Whole eggs | 2 | 2 | 2 | 2 |
| Volume of baked cakes (cc./lb.): | | | | |
| Machine mix | 1,410 | 1,475 | 1,310 | 1,470 |
| Hand mix | 1,320 | 1,405 | 1,210 | 1,490 |

A finer grain is generally preferred in cakes. Although a larger cake volume might be expected to result in a coarser grain, the grains of the yellow and chocolate cakes compared as follows: A value of 1 was assigned to an undesirable coarse grain, and 10 to a very fine grain. Values of 7 to 10 are preferred in a cake.

|  | Yellow | |
| --- | --- | --- |
|  | Unmilled | Milled |
| Machine beaten | 6 | 7 |
| Hand beaten | 5 | 8 |

Similar improvement was noted in a comparison of grain size of the chocolate cakes.

The following examples represent formulas of different types of cake mixes and are representative of a part of the wide variety of mixes which may be prepared by this invention.

EXAMPLE II

White cake: Percent
- Sugar _____ 44.3
- Flour _____ 35.4
- Shortening _____ 15.0
- Milk solids _____ 2.5
- Salt _____ 1.0
- Soda _____ 0.7
- Monocalcium phosphate _____ 0.5
- Sodium acid pyrophosphate _____ 0.6

EXAMPLE III

Devil's food cake: Percent
- Sugar _____ 43.4
- Flour _____ 32.4
- Shortening _____ 13.0
- Milk solids _____ 2.5
- Salt _____ 0.7
- Soda _____ 1.3
- Monocalcium phosphate _____ 0.2
- Sodium acid pyrophosphate _____ 0.3
- Cocoa _____ 6.2

EXAMPLE IV

Yellow cake: Percent
- Sugar _____ 43.2
- Flour _____ 36.6
- Shortening _____ 13.0
- Milk solids _____ 4.9
- Salt _____ 0.5
- Soda _____ 0.7
- Monocalcium phosphate _____ 0.5
- Sodium acid pyrophosphate _____ 0.6

EXAMPLE V

Yellow cake: Percent
- Sugar _____ 43.5
- Flour _____ 41.5
- Shortening _____ 10.0
- Milk solids _____ 2.5
- Salt _____ 0.7
- Soda _____ 0.7
- Monocalcium phosphate _____ 0.5
- Sodium acid pyrophosphate _____ 0.6

The above mixes can be made by thoroughly mixing the sugar, flour and shortening and then milling by passing through shearing and crushing means such as a 3-roll mill, the first and second rollers having speed ratios of 3 to 1, and the second and third rollers having speed ratios of 2 to 1. When the work input is between 5 and 70 watt-hours per pound the sugar will be fragmented and bonded to and embedded in the flour. The shortening will be distributed throughout the mix, forming a thin film throughout the sugar and flour and coating the bonded sugar and flour.

After milling, the other ingredients are added and thoroughly blended in, and the mixture finally passed through an impact grinder such as is described hereinbefore.

Cakes of superior volume and grain can be made by merely adding 2 eggs and about 1 cup of water to 20 oz. mixes, beating for two minutes and baking.

The following example shows a formula for a "complete" mix to which only water has to be added in making the batter. In this example a cake mix of this invention was compared with commercially available mixes.

EXAMPLE VI

Yellow cake: Percent
- Sugar _____ 41.8
- Flour _____ 36.3
- Shortening _____ 13.0
- Milk solids _____ 2.5
- Salt _____ 0.7
- Soda _____ 0.65
- Monocalcium phosphate _____ 0.5
- Sodium acid pyrophosphate _____ 0.55
- Egg solids _____ 4.0

A yellow cake mix, prepared as in Example I, was compared with three yellow cake mixes purchased on the market, and which were of comparable formula so that the only significant difference was in the manner of making the mix. A batter was prepared from each by adding the liquid ingredients required, and beating for two minutes. After baking under identical conditions the cake volume and grain rating (described in Example 1) were measured as follows:

|  | Cake Vol. (cc./lb.) | Grain Rating |
| --- | --- | --- |
| Milled mix of this invention | 1,475 | 8.5 |
| Mix A | 1,330 | 7.7 |
| Mix B | 1,250 | 8.0 |
| Mix C | 1,355 | 6.8 |

As has been heretofore stated the process of this invention is also applicable to culinary goods other than cakes. Batters can be more easily prepared from the mixes than from prior art mixes, and mixes of this invention tend to be less lumpy after extended periods of storage. The following example shows a cookie mix of this invention.

EXAMPLE VII

*Chocolate chip cookie*

19.0 parts of brown sugar, 5.0 parts of dextrose, and 31.0 parts of bleached, short patent soft wheat flour were mixed together in a Hobart paddle mixer. To this was added 15.0 parts of plastic triglyceride shortening. The mixing was continued until a homogeneous preblend was formed. During the mixing the temperature of the blend was maintained at not more than 70° F. by the addition of Dry Ice to the mix. This preblend was passed through a 3-roll mill having a speed ratio of 3:1 between the first two rolls and a speed ratio of 2:1 between the second and third rolls. The work input was between 12 and 18 watt-hours per pound. The milled mixture was placed in a Hobart mixer and the following ingredients were added and mixed in.

|  | Parts |
| --- | --- |
| Milled preblend | 70.0 |
| Granulated sugar | 17.0 |
| Non-fat dried milk solids | 1.5 |
| Salt | 1.0 |
| Soda | 0.5 |
| Plastic triglyceride shortening | 10.0 |

During this final mixing, the temperature was maintained at not over 50° F.

A cookie batter was made by adding one egg to 300 g. of the mix and stirring by hand until the batter was smooth. 90 g. of chocolate bits were folded into the batter, and portions of the batter were dropped on a cookie sheet and baked at 375° F. for 10 to 12 minutes.

As has been previously stated, the addition of normally plastic shortening which has been heated to convert it to liquid form will result in improved cakes when the mixes are prepared according to the process of this invention.

The following examples illustrate the preparation of mixes in which the shortening was added in liquid form.

EXAMPLE VIII

*Yellow cake*

895 g. of sugar and 763 g. of flour were mixed together in a Hobart paddle mixer. 286 g. of shortening were heated to about 200° F. and sprayed into the mixer over a 15-minute period while the mixing was continued. The mixture was then passed through a 3-roll roller mill in which the ratios of speeds between the first and second rolls was 3:1 and between the second and third rolls was 2:1. The filled preblend was then passed through an impact grinder as heretofore described to break up any agglomerates present.

The following were then mixed together in a Hobart paddle mixer:

|  | Parts |
| --- | --- |
| Milled preblend of sugar, flour and shortening | 88.5 |
| Dried milk solids | 4.0 |
| Egg yolk solids | 3.2 |
| Egg white solids | 1.5 |
| Salt | 1.0 |
| Sodium bicarbonate | 0.64 |
| Monocalcium phosphate | 0.53 |
| Sodium acid pyrophosphate | 0.53 |
| Flavoring | 0.10 |

A similar mix was prepared except that the shortening was added to the mixer prior to milling as small pieces in plastic form.

Batters were made by adding 1⅓ cups of water to 20 oz. of each of the mixes, and these batters were baked into cakes at a temperature of 375° F. using 8-inch pans. The following data show a comparison of batter viscosity and cake sizes for the two mixes.

|  | Shortening added in plastic form | Shortening added in liquid form |
| --- | --- | --- |
| Batter viscosity | Average | Much thicker than average. |
| Average "volume" | 3.26 | 3.94. |

(The "volume" measurement was determined by measuring in inches the center and edge height of a cake layer and adding the two values together. For the above data the "volumes" for two separate layers were averaged for each mix.)

EXAMPLE IX

*Cookies*

34 parts of sucrose and 37 parts of cake flour were mixed together in a Hobart paddle mixer. During the mixing, Dry Ice was added to cool the mixture to 40° F. 25 parts of plastic triglyceride shortening was heated to 140° F., and the resulting liquid was sprayed through a two-fluid nozzle onto the sugar and flour while the mixing was continued. After a homogeneous blend was formed, it was passed through a hammer mill using a one-inch screen to break up any large lumps present. The hammer-milled mix was then passed through a roller mill similar to that described in Example VII. The work input was 42.5 watt-hours per pound. The following ingredients were then thoroughly mixed in, using a Hobart mixer:

|  | Parts |
| --- | --- |
| Milled preblend | 96.00 |
| Non-fat dried milk solids | 0.50 |
| Salt | 1.00 |
| Soda | 0.50 |
| Dried molasses | 2.00 |

This mix was made into cookies by adding one egg to 300 g. of the mix and stirring by hand until the batter was smooth. Portions of the batter were dropped on a cookie sheet and baked at 375° F. for 10 to 12 minutes.

From the foregoing examples it can clearly be seen that by the practice of this invention a mix is produced which can be used to make cakes having a large volume and fine grain, and also other superior baked products with a batter preparation which is much simpler and quicker than has heretofore been possible.

This is a continuation-in-part of copending application, Serial No. 521,416, filed July 11, 1955, now abandoned.

What is claimed is:

1. A pulverulent and free flowing culinary mix suitable for the preparation of baked goods, said mix comprising crystalline sugar, flour and shortening, a major part of the crystals of said sugar being fragmented and mechanically bonded to particles of said flour, and said shortening being substantially dispersed in a thin film throughout and coating said bonded sugar and flour.

2. A culinary mix according to claim 1 wherein not more than 10 percent of said mix has a sedimentation density greater than 1.59 and not more than 25 percent of said mix has a sedimentation density less than 1.50.

3. A culinary mix according to claim 1 wherein the shortening contains as an emulsifier a partially esterified polyhydric compound having surface active properties.

4. A pulverulent and free-flowing culinary mix comprising from 38 to 48% sugar, from 25% to 45% flour, and from 4% to 25% shortening, a major part of the crystals of said sugar being fragmented and mechanically bonded to particles of said flour, and said shortening being substantially dispersed in a thin film throughout and coating said bonded sugar and flour, not more than 10 percent of said mix having a sedimentation density greater than 1.59 and not more than 25 percent of said mix having a sedimentation density less than 1.50.

5. The method of preparing culinary mix comprising the steps of forming a homogeneous blend containing sugar, flour and shortening, and thereafter subjecting said blend to simultaneous shearing and crushing forces whereby a pulverulent and free-flowing mix is obtained in which a major part of the crystals of said sugar are fragmented and mechanically bonded to particles of said flour, and said shortening is dispersed substantially in a thin film throughout and coating said bonded sugar and flour.

6. The method according to claim 5 wherein the total work input of said shearing and crushing forces is from 5 to 70 watt-hour/lb.

7. The method according to claim 5 wherein the blend is passed between two rollers moving at different speeds.

8. The method of preparing a culinary mix comprising the steps of forming a homogeneous blend containing sugar and flour, spraying shortening in liquid form into said blend, agitating said blend during said spraying step to form a homogeneous mixture, and thereafter subjecting said homogeneous mixture to simultaneous shearing and crushing forces.

References Cited in the file of this patent

UNITED STATES PATENTS

| | | |
|---|---|---|
| 269,743 | Thorpe | Dec. 26, 1882 |
| 827,936 | Obermaier | Aug. 7, 1906 |
| 2,508,393 | Jaeger | May 23, 1950 |
| 2,555,902 | Salo et al. | June 5, 1951 |